US007284569B2

(12) United States Patent
Takemaru

(10) Patent No.: US 7,284,569 B2
(45) Date of Patent: Oct. 23, 2007

(54) STEAM VALVE

(75) Inventor: Ryuhei Takemaru, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 10/956,153

(22) Filed: Oct. 4, 2004

(65) Prior Publication Data

US 2006/0070666 A1 Apr. 6, 2006

(51) Int. Cl.
*F16K 31/06* (2006.01)

(52) U.S. Cl. ............... 137/545; 137/549; 137/613; 137/625.3

(58) Field of Classification Search ............ 210/322; 137/544, 549, 545, 613
See application file for complete search history.

(56) References Cited

U.S. PATENT DOCUMENTS 1,898,816 A * 2/1933 Crossen ................ 210/431
3,262,563 A * 7/1966 Pall .......................... 210/90
4,825,906 A * 5/1989 Hartman ................ 137/625.3
5,870,896 A * 2/1999 Clark et al. ................ 60/670
2004/0035769 A1* 2/2004 Mouhebaty ............. 210/130

FOREIGN PATENT DOCUMENTS

JP        54-145071    * 11/1979
JP        10-8913        1/1998

* cited by examiner

*Primary Examiner*—Eric Keasel
*Assistant Examiner*—Cloud Lee
(74) *Attorney, Agent, or Firm*—Oblon, Spivak, McClelland, Maier & Neustadt, P.C.

(57) ABSTRACT

In a steam valve, a strainer is arranged between a valve body and a valve casing in which the valve body is accommodated, and a screen assembly is mounted on an outer peripheral portion of the strainer. The screen assembly includes a temporary screen unit and a permanent screen unit which is arranged inside the temporary screen unit. Each of the screen units is a substantially cylindrical structure made of a plate formed with perforations.

1 Claim, 8 Drawing Sheets

STEAM VALVE

BACKGROUND OF THE INVENTION

1. Field of the Invention

The present invention relates to a steam valve used in a steam turbine plant or like, and more particularly, to a steam valve having an improved strainer accommodated in a valve casing and adapted to remove impurities, or foreign objects or materials contained in steam.

2. Related Art

Generally, steam-turbine plants have many steam valves having different diameters in accordance with their functions or applications. In these steam valves, a main-steam stop valve and a steam-regulation valve, for example, both of which are provided between a steam turbine and a steam generator, such as a boiler, are inevitably very large pressure-resistant valves since both valves are exposed to ultra-high-pressure (16.6 MPa to 24.1 MPa) and very-high-temperature (538° C. to 566° C.) steam.

Such a very large main-steam stop valve or steam-regulation valve, which is exposed to ultra-high-pressure and very-high-temperature steam, has a strainer accommodated in a casing. This strainer prevents welding scraps generated or tools left during construction from colliding with a valve body when a steam turbine plant is subjected to a ventilation test in a trial run before normal operation to thereby prevent accidents from causing.

In a steam valve accommodating a strainer having such a function, as shown in FIG. 9, main steam guided from a boiler through a steam inlet 1 strikes a closed area 3, which faces the steam inlet 1, of a strainer 2 and then moves in the circumferential direction of the strainer 2. The moved main steam flows into the strainer 2 through holes or perforations 4 of the strainer 2 to be supplied to a steam turbine through a steam outlet 5.

This steam valve structure prevents foreign objects contained in steam that enters through the steam inlet 1 during a trial run from coming into direct contact with a screen 7 of the strainer 2. Immediately after a trial run starts, a relatively large foreign object is often floated. If such a foreign object struck the screen 7 directly, the foreign object would break the screen 7 and enter the steam valve. In order to prevent this entry, there is adopted a structure in which a floated foreign object firstly strikes the closed area 3 of the strainer to reduce its speed so that the screen 7 reliably captures the foreign object.

As shown in FIGS. 9 and 10, relatively fine impurities generated in a boiler, such as oxide scale, are removed by the use of the screen 7 circumferentially fixed in a body 6 of the strainer 2.

The screen 7 has a three-layered (triple wall) structure consisting of a permanent screen unit 8 circumferentially mounted on a part of the body 6 of the strainer 2, a temporary screen unit 9 arranged outside the permanent screen unit 8, and a protective screen unit 10 arranged further outside the temporary screen unit 9.

In this three-layered screen 7, the permanent screen unit 8 is composed of a relatively-coarse-mesh wire net, the temporary screen unit 9 is composed of a relatively-fine-mesh wire net, and the protective screen unit 10 is composed of a relatively-coarse-mesh wire net. As shown in FIG. 11, these screen units are fixed to and supported on the body 5 of the strainer 2 by means rivets 11, for example.

In a recent large-capacity steam-turbine plant, the permanent screen unit 8 is composed of a coarse-mesh wire net to remove impurities, such as oxide scale produced in a boiler, during normal (steady) operation of the plant, the temporary screen unit 9 has a fine-mesh wire net structure to remove impurities during a trial run (test operation), and the protective screen unit 10 has a coarse-mesh wire net structure to protect the temporary screen unit 9.

The mesh size of each wire net is determined in consideration of strength, pressure loss of steam, and the degree of removal of impurities.

In the three-layered screen 7, the temporary screen unit 9 and the protective screen unit 10 are used during a trial run, and after the trial run, both screen units are demounted or removed. For the normal operation, the permanent screen unit 8 is again fixed to and supported on the strainer body 6 by the rivets 11.

Japanese Unexamined Patent Publication (KOKAI) No. HEI 10-8913 discloses a steam valve, such as an intercept valve, used in a steam turbine plant, having a strainer.

In such a steam valve having a strainer to which a three-layered screen is circumferentially mounted, impurities or foreign objects contained in steam are reliably prevented from entering the strainer, and therefore, a steam turbine can operate safely in a stable condition. However, thermal shock caused by ultra-high pressure and very-high temperature steam has a direct impact on a wire-net screen. Therefore, with years of use, the wire net is expanded, contracted, or loosened, producing vibration or noise, and finally, the wire net will be broken, providing a significant matter of defective.

Nowadays, in order to improve thermal efficiency in a plant, a steam temperature in a steam turbine is prone to be high. This results in a decrease in the allowable stress of a screen. Although such defect may be eliminated by strengthening the screen, if the diameter of each wire of the wire net is increased, the mesh size is inevitably large and fine or minute impurities are thus not removed. In other words, an improvement in thermal efficiency runs counter to an increase in strength.

SUMMARY OF THE INVENTION

The present invention was conceived to substantially eliminate defects or drawbacks encountered in the prior art mentioned above and an object of the present invention is to provide a steam valve having a screen, with high strength, circumferentially mounted to a strainer and being capable of reliably removing even fine particulate impurities.

The above and other objects can be achieved according to the present invention by providing a steam valve comprising:

a steam inlet;

a valve body for regulating a flow of steam entering into the valve body through the steam inlet;

a valve casing accommodating the valve body and communicated with the steam inlet;

a strainer arranged between the valve body and the valve casing so as to surround the valve body and adapted to remove a foreign object contained in the steam; and a screen assembly mounted to an outer peripheral portion of the strainer, the screen assembly including at least one screen unit formed from a perforated plate.

In a preferred embodiment of the present invention of the aspect mentioned above, the screen assembly may include a temporary screen unit and a permanent screen unit, the permanent screen unit being arranged inside the temporary screen unit so as to contact the outer peripheral portion of the strainer.

The temporary screen and the permanent screen are formed with perforations, respectively, and a diameter of each of the perforations of the temporary screen unit is formed to be equal to or smaller than a diameter of each of the perforations of the permanent screen unit. The perforations of the temporary screen unit may be displaced in positions from the perforations of the permanent screen unit.

The permanent screen unit may be joined to the strainer by means of welding at both end portions of the permanent screen unit and joined thereto by means of rivet at an intermediate portion between both the end portions of the permanent screen, and the temporary screen unit has an opening at an intermediate portion thereof so as to pass the rivet therethrough and is welded to the permanent screen unit at both end portions thereof.

It may be preferred that the strainer has a cylindrical structure and the perforated screen assembly is mounted on the outer peripheral portion of the cylindrical strainer.

The screen assembly is formed with a number perforations, and it may be desired that when a side portion of the screen assembly mounted on the peripheral portion of the cylindrical strainer is developed, the perforations formed to the screen assembly have an arrangement in a fashion that centers of neighboring three perforations constitute vertexes of a regular triangle having one side of a length corresponding to a pitch "a" of adjacent two perforations, the pitch "a" being a sum of a diameter "d" of the perforation and a distance L between the adjacent two perforations, the diameter "d" and pitch "a" being set to optional values, respectively, in accordance with the arrangement of the screen assembly relative to the strainer.

The strainer has a section of the outer peripheral portion of the strainer to which holes are formed and another section of the outer peripheral portion thereof formed as a closed area so as to face the steam inlet, formed with no holes. On the other hand, the strainer may have the outer peripheral portion to which holes are entirely formed.

According to the steam valve of the present invention of the structure mentioned above, either the permanent screen unit only, or both the permanent screen unit and the temporary screen unit are mounted to the body of the strainer, and each of the permanent screen unit and the temporary screen unit is formed to provide a cylindrical or substantially cylindrical structure made of a perforated plate. The perforations of the cylindrical permanent screen unit and temporary screen unit are arranged such that the center of each perforation corresponds to each vertex of a regular triangle, and as a result, a space ratio can be freely set. In addition, if a material with increased strength is selected for the plate, the screen can realize a strength required for withstanding shock caused by the main steam.

DESCRIPTION OF THE PREFERRED EMBODIMENTS

The preferred embodiments of a steam valve according to the present invention will be described hereunder with reference to the accompanying drawings.

Figure 1:
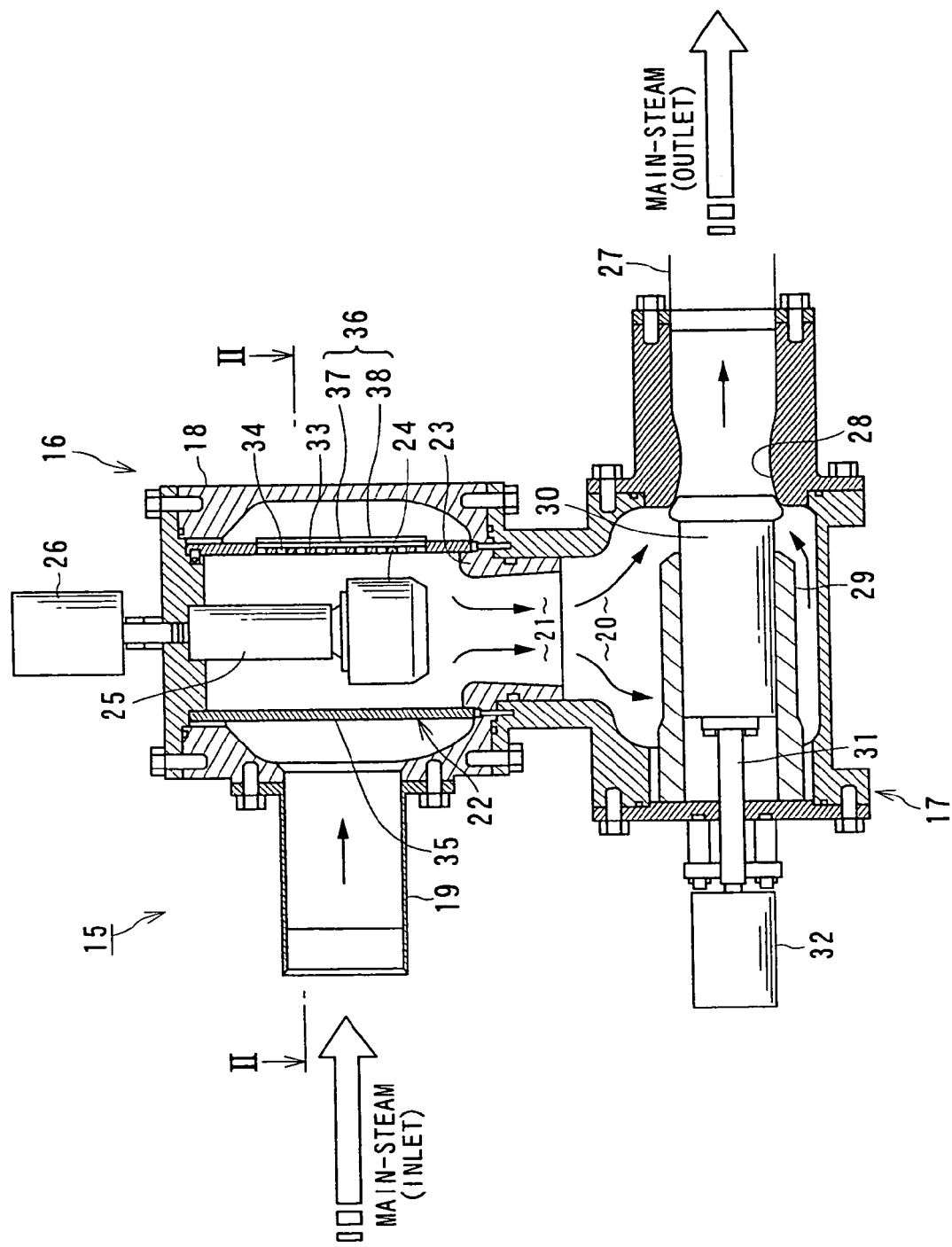
FIG. 1 is a schematic longitudinal sectional view of a steam valve according to a first embodiment of the present invention.

With reference to FIG. 1 showing a steam valve according to a first embodiment of the present invention, a steam valve 15 is a large valve having a combined structure in which, for example, a main-steam stop valve unit and a steam-regulation valve unit are accommodated in a single valve casing.

The steam valve 15 in this embodiment has a first valve unit 16, which corresponds to the main-steam valve unit, arranged upstream of a main steam flow and a second valve unit 17, which corresponds to the steam-regulation valve unit, arranged downstream of the first valve unit 16. The first valve unit 16 and the second valve unit 17 are accommodated in a single or common valve casing 18.

The first valve unit 16 has a first main-steam inlet 19 in the valve casing 18 and a first main-steam outlet 21 communicated with a second main-steam inlet 20 of the second valve unit 17. In the first valve unit 16, a cylindrical strainer 22 for removing impurities, such as oxide scale, is accommodated.

The first valve unit 16 has a first valve body 24 and a first driving unit 26. The first valve body 24 can be freely attached to or detached from a first valve seat 23 adjacent to the first main-steam outlet 21, and the first driving unit 26 can reciprocate the first valve body 24 with a first valve rod 25 interposed therebetween.

The first driving unit 26, which reciprocates the first valve body 24, is arranged in a direction perpendicular to the axis of the first main-steam inlet 19 outside the valve casing 18 in order to surely provide a wider path for passing main steam in the valve casing 18 to effectively reduce pressure loss of the main steam.

The second valve unit 17 has a second main-steam outlet 27, a second valve body 30, and a second driving unit 32. The second main-steam outlet 27 is disposed downstream of the valve casing 18. The second valve body 30 can be freely attached to or detached from a second valve seat 28 adjacent to the second main-steam outlet 27 and can slide in a sleeve 29. The second driving unit 32 can reciprocate the second valve body 30 with a second valve rod 31 disposed therebetween.

Figure 2:
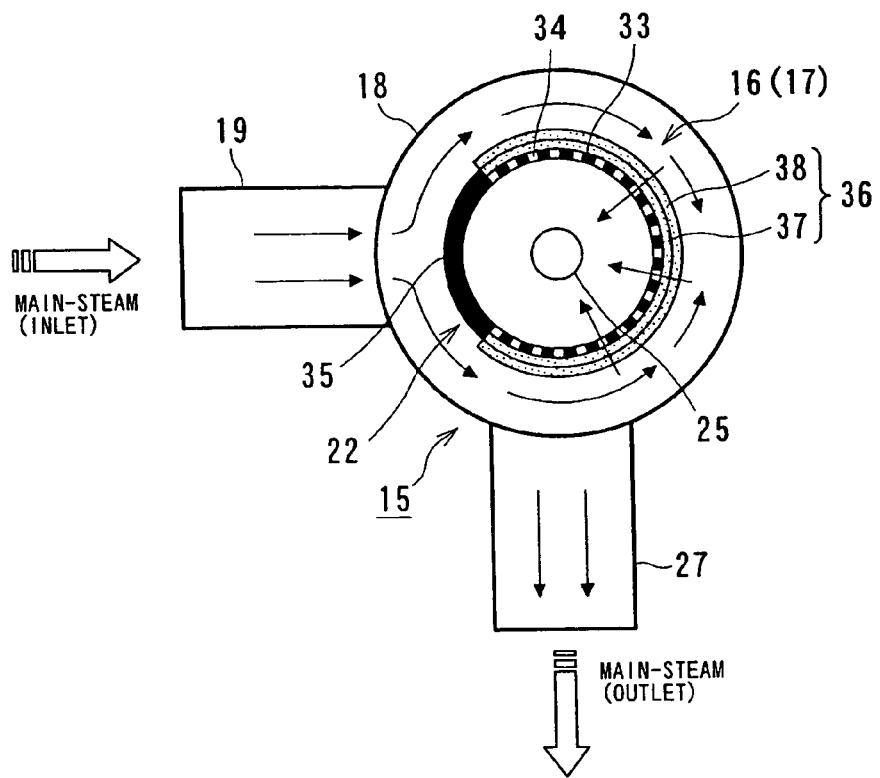
FIG. 2 is a sectional view taken along the line II-II shown in FIG. 1.

As shown in FIGS. 1 and 2, the strainer 22 accommodated in the valve casing 18 in the first valve unit 16 has a closed area 35 for stopping a main steam flow and then moving the main steam flow in the circumferential direction and an area, other than the closed area, to which holes 34 are formed, circumferentially arranged on the downstream side of the closed area 35. The closed area 35 is disposed in a part of a cylindrical (e.g., circular cylindrical) strainer body 33 at a position facing the first main-steam inlet 19. The holes 34 of the strainer body 33 guide the main steam from the outside to the inside thereof and are arranged along the axial direction of the first valve rod 25.

The strainer 22 has a substantially cylindrical screen 36 in the circumferential direction of the strainer body 33. The screen 36 is mounted so as to cover the holes 34 of the strainer 22 from the outside.

As shown in FIG. 2, the screen 36 has a double or dual structure comprising substantially a double cylindrical structure consisting of a permanent screen unit 37 mounted on cut portions formed in the cylindrical strainer body 33 of the strainer 22 and a temporary screen unit 38 mounted outside the permanent screen unit 37, with the closed area of the strainer 22 uncovered. This double cylindrical structure may be called merely "double structure" hereinlater.

Each of the permanent screen unit 37 and the temporary screen unit 38 is formed from, for example, stainless steel and is a cylindrical structure made of a perforated plate. The permanent screen unit 37 and the temporary screen unit 38 have many perforations 39a and 39b, respectively, which serve as mesh holes, along the axial direction and the circumferential direction of the strainer 22.

Figure 3:
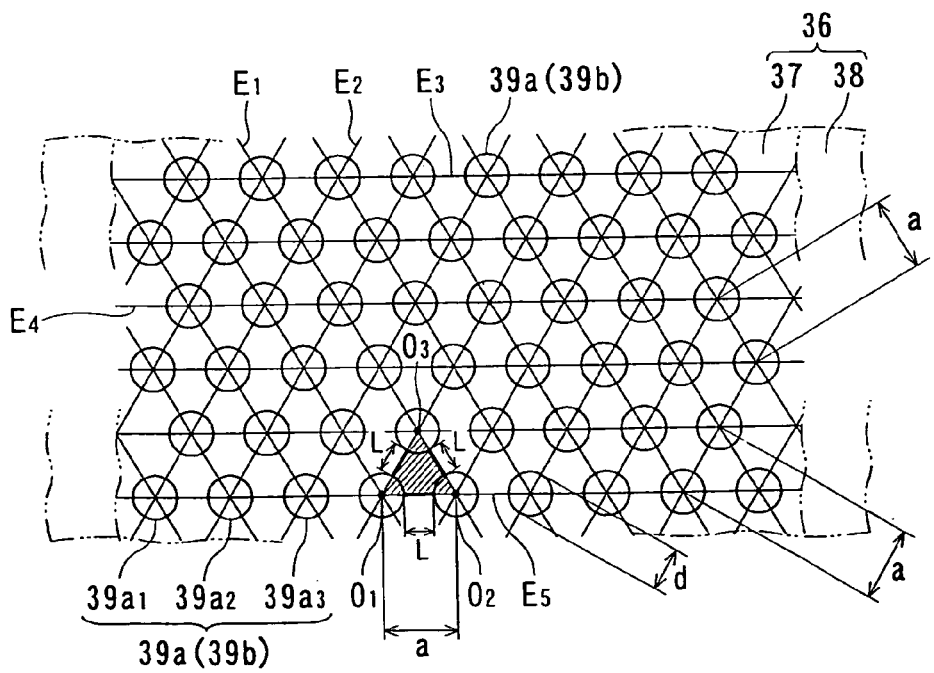
FIG. 3 is a developed plan view of a permanent screen unit and a temporary screen unit mounted to a strainer used in the steam valve according to the first embodiment.

As shown in FIG. 3, the perforations 39a ($39a_1$, $39a_2$, $39a_3$, ...) are located such that the centers these perforations 39a correspond respectively to the intersections $O_1$, $O_2$, $O_3$, ..., of marking-off lines $E_1$, $E_2$, $E_3$, ..., defining regular triangles on the plane of the permanent screen unit 37 and each perforation has a diameter d. The perforations 39b of the temporary screen unit 38 are located in the same manner.

That is, the each of the screen units is formed with a number perforations, and when a side portion of the screen unit is developed, the perforations 39 formed to the screen unit have an arrangement in a fashion that centers of neighboring three perforations 39 constitute vertexes of a regular triangle having one side of a length corresponding to a pitch "a" of adjacent two perforations, the pitch "a" being a sum of a diameter "d" of the perforation and a distance L between the adjacent two perforations, the diameter "d" and pitch "a" being set to optional values, respectively, in accordance with the arrangement of the screen assembly relative to the strainer.

The diameter of each of the perforations 39b may be equal to or smaller than that of each of the perforations 39a.

If the diameters of both perforations 39a and 39b are the same, a space ratio S indicating a ratio with respect to main steam that passes through the permanent screen unit 37 and the temporary screen unit 38 can be expressed as a ratio of an aperture area D of the perforations 39 included in a single triangular area T (e.g., hatched section in FIG. 3) to the triangular area T and can be given by the following equation (1):

Equation (1)

$$S = \frac{D}{T} = \frac{\frac{\pi}{4}d^2 \times \frac{1}{2}}{\frac{1}{2} \times a \times \frac{\sqrt{3}}{2}a} = \frac{\pi d^2}{2\sqrt{3}\,a^2}$$ (1)

where "a" is a pitch of the perforations 39, for example, between the perforation $39a_1$ and the adjacent perforation $39a_2$.

The space ratio S given by the equation (1) is the same as that of a known wire-net temporary screen unit. Each of the diameter d and the pitch "a" of the perforation 39a can be set to an optional value so that the space ratio in the screen is freely changed.

For the strength of the permanent screen unit 37 including these perforations 39a and the temporary screen unit 38 including the perforations 39b, a shearing stress is expressed as a ratio of {(closed triangular area T−aperture area D of perforations)×external pressure P} to a length L of distances between the three perforations (e.g., $39a_1$, $39a_2$, and $39a_3$) in the triangular area, and can be given by the following equation (2):

Equation (2)

$$\tau = \frac{\{(T-D) \times P\}}{L} = \frac{\left\{\frac{\sqrt{3}}{4}a^2 - \frac{\pi d^2}{8}\right\} \times P}{3 \times (a-d) \times h}$$ (2)

where "h" is a plate thickness of each of the permanent screen unit 37 and the temporary screen unit 38.

For the shearing stress given by the equation (2), when the plate thickness "h" is set to a suitable value, the strength of the screen in this embodiment is higher than that of a known wire-net temporary screen unit.

Figure 4:
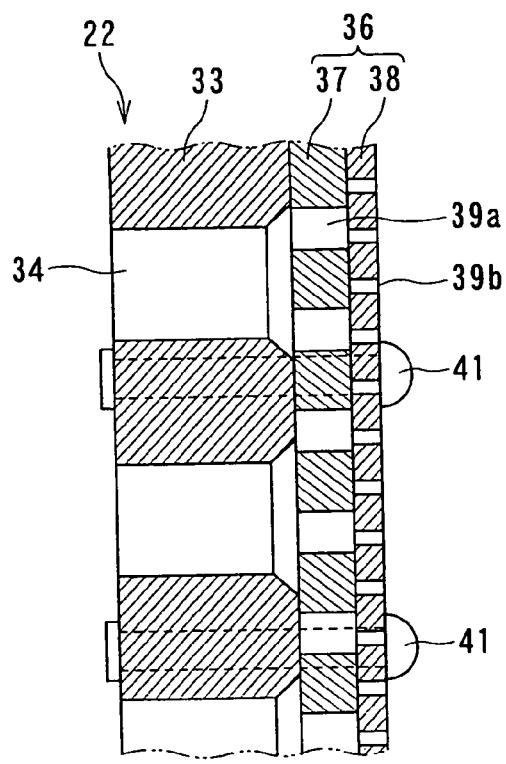
FIG. 4 shows the mounting of the permanent screen unit and the temporary screen unit mounted to the strainer used in the steam valve according to the first embodiment.

As shown in FIG. 4, the permanent screen unit 37 and the temporary screen unit 38 mounted over the strainer body 33 are fixed to and supported on the strainer body 33 with rivets 41 inserted. The upper and lower ends of the permanent screen unit 37 and the temporary screen unit 38 are fixed to the strainer body 33 by welding.

As described above, in this embodiment, the permanent screen unit 37 and the temporary screen unit 38 are circumferentially located on the downstream side of the closed area 35 formed in the body 33 of the strainer 22 and have the perforations 39a and the perforations 39b, respectively, located in positions of the intersections of the marking-off lines or the virtual lines defining regular triangles. As a result, the screen is less prone to become clogged with impurities or foreign objects, and thus, main steam is reliably supplied to a steam turbine in a stable condition.

In addition, since each of the permanent screen unit 37 and the temporary screen unit 38 is a cylindrical structure made of plate, the screen in this embodiment can provide greatly increased strength, compared with a known wire-net screen. As a result, the possibility that the screen becomes loosened or damaged can be reduced significantly, and therefore, a protective screen, which is required for a known steam valve and arranged outside a temporary screen unit, is not necessary.

In this first embodiment, the permanent screen unit 37 and the temporary screen unit 38 have substantially cylindrical structures made of perforated plates having the perforations 39a and the perforations 39b, respectively, thus increasing the strength of the screen, and as a result, the screen can bear against shock caused by the main steam flow.

In addition, according to this first embodiment, although both the permanent screen unit 37 and the temporary screen unit 38 are mounted to the strainer body 33, for example, in an overlapped manner, the present invention is not limited to this structure. That is, in a trial run, both the permanent screen unit 37 and the temporary screen unit 38 are mounted, and then, the temporary screen unit 38 may be removed (not mounted) when transferred to the normal operation. Alternatively, even in a trial run, only the permanent screen unit 37 may be mounted to the body 33 of the strainer 22. This matter will be determined, for example, in accordance with the size and the amount of impurities or foreign objects contained in the main steam.

Figure 5:
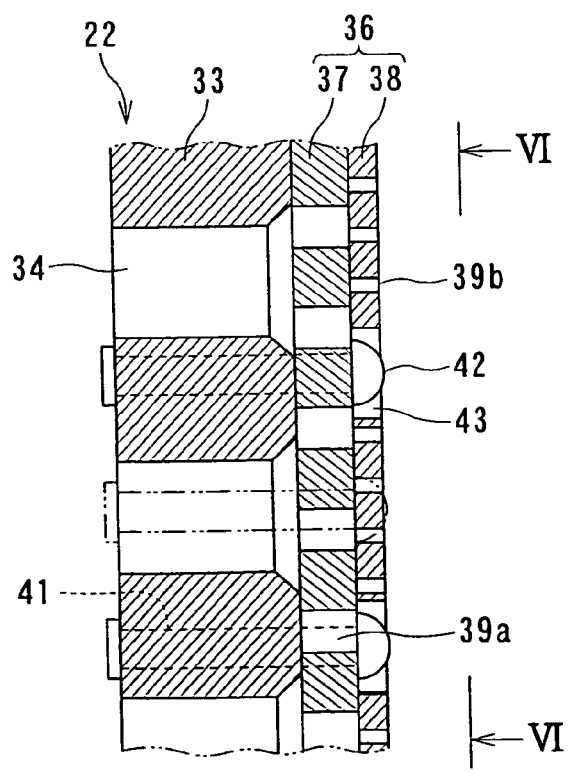
FIG. 5 is a fragmentary longitudinal sectional view, similar to FIG. 4, of a steam valve according to a second embodiment of the present invention.
Figure 6:
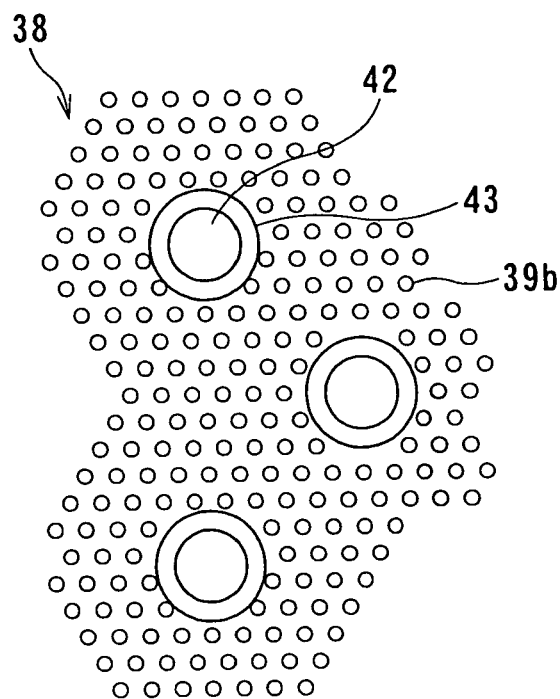
FIG. 6 is a plan view, looking from arrows VI shown in FIG. 5.

FIGS. 5 and 6 show concepts of a steam valve according to a second embodiment of the present invention, in which FIG. 5 is a fragmentary longitudinal sectional view of the steam valve in this embodiment, and FIG. 6 is a plan view, looking from the arrows VI in FIG. 5.

In the steam valve of this embodiment, the rivets 41 are inserted through the strainer body 33 after the permanent screen unit 37 and the temporary screen unit 38 are mounted to the strainer body 33 so as to fix and support the permanent screen unit 37 and the temporary screen unit 38 circumferentially mounted to the strainer body 33 of the strainer 22. In this embodiment, furthermore, in order to simplify the operation of demounting the temporary screen unit 38, the temporary screen unit 38 has openings 43 through which heads 42 of the rivets 41 can readily pass. The openings 43 formed in the temporary screen unit 38 may be replaced with spot-faced holes.

In a known steam valve, in order to mount the permanent screen unit and the temporary screen unit to the strainer body, the upper and lower ends of both screen units and the adjacent area of the body are welded to fix and support both screen units by welding parts after the rivets are inserted through the permanent screen unit and the temporary screen unit.

However, since the permanent screen unit and the temporary screen unit are composed of the wire-net structures, the welding parts are inevitably not continuous, and therefore, fluid oscillation due to the screen in a trial run and noise associated with such fluid oscillation may be caused. When a steam turbine is shifted to the normal operation, the temporary screen unit is removed so that the strainer includes only the permanent screen unit. The joint operation by two kinds of means, i.e., the rivets and the welding parts, as described above, is disadvantageous in that the joint removing working requires is a time-consuming operation and troublesome job. In particular, the use of the rivets will constitute a bar of simplifying the operation steps since the permanent screen unit and the temporary screen unit are jointed together by means of such rivets, and therefore, at the time of transferring to the normal operation, is was obliged for the permanent screen unit to be riveted again.

However, according to the present invention, in the steam valve 15, the openings 43 are formed in the temporary screen unit 38 so as to allow the heads 42 of the rivets 41 to readily pass therethrough. More specifically, the permanent screen unit 37 is joined to the strainer 22 by means of welding at both end (upper and lower end) portions of the permanent screen unit 37 and joined thereto by means of rivets 41 at an intermediate portion between both the end portions of the permanent screen, and moreover, the temporary screen unit 38 has openings 43 at an intermediate portion thereof so as to pass the rivets therethrough and is welded to the permanent screen unit at both end portions thereof.

Since the temporary screen unit 38 has the openings 43 for readily passing the heads 42 of the rivets 41 therethrough, the temporary screen unit 38 can be easily mounted to and demounted from the strainer body 33, and therefore, the operational efficiency in the steam valve 15 can be improved.

Figure 7:
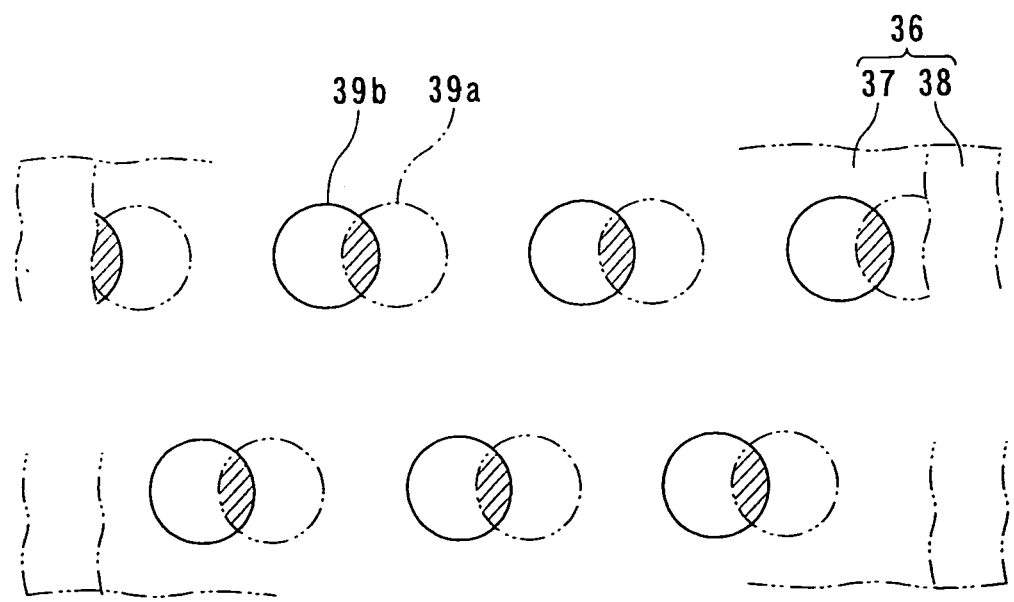
FIG. 7 is a developed plan view of a steam valve according to a third embodiment of the present invention.

FIG. 7 is a developed view of a steam valve according to a third embodiment of the present invention.

In the steam valve of this embodiment, at a time of mounting the permanent screen unit 37 and the temporary screen unit 38 to the strainer body 33, the perforations 39a of the permanent screen unit 37 and the perforations 39b of the temporary screen unit 38 are displaced in positions from each other.

In this embodiment, as described above, since the perforations 39a of the permanent screen unit 37 and the perforations 39b of the temporary screen unit 38 are displaced from each other in the circumferential direction, a space ratio, which indicates a ratio with respect to main steam that passes through the screen, can be set to a desired optional value.

Figure 8:
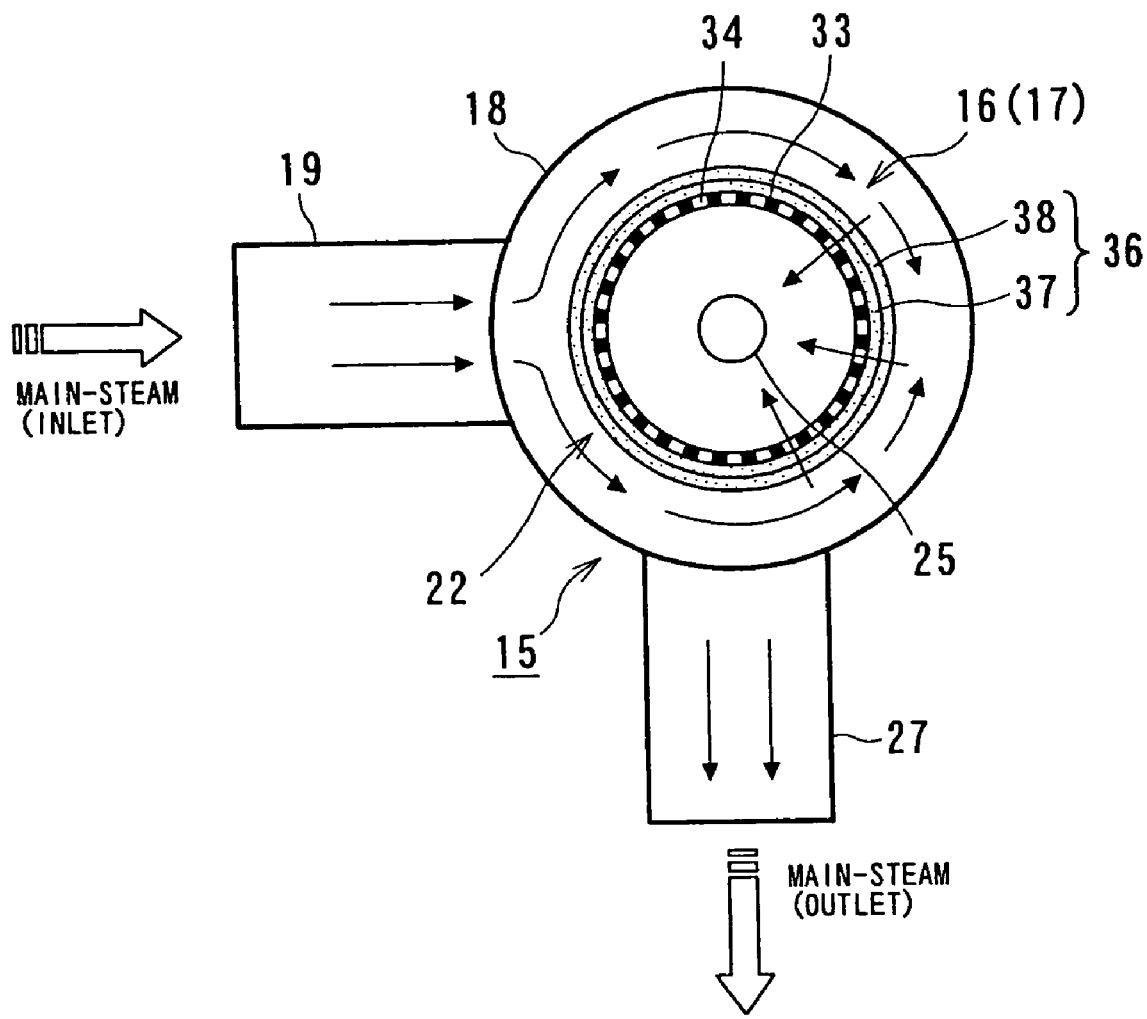
FIG. 8 is a schematic sectional view, similar to FIG. 2, of a steam valve according to a fourth embodiment of the present invention as viewed from II-II shown in FIG. 1.
Figure 9:
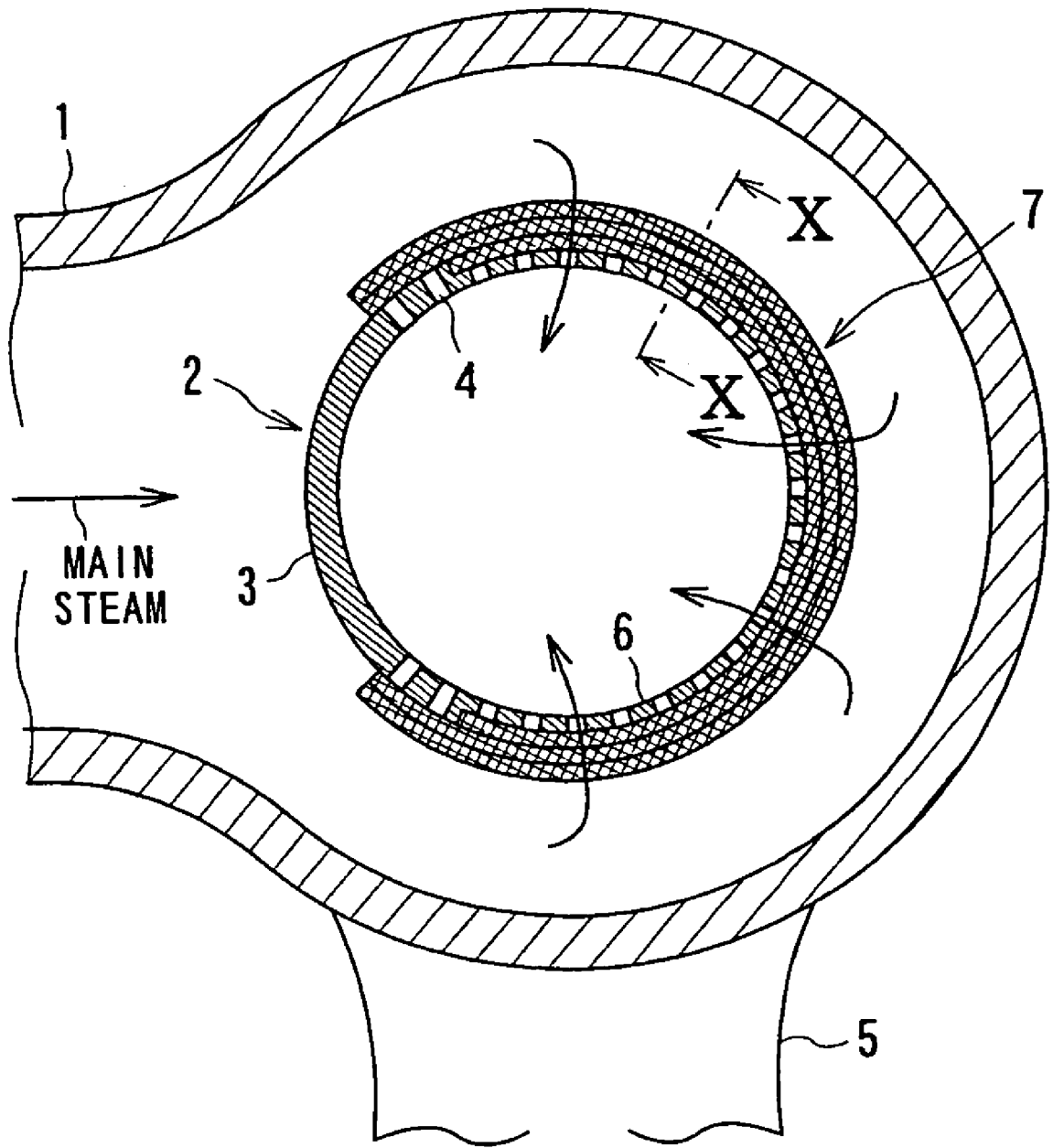
FIG. 9 is a schematic cross-sectional view of a known steam valve.
Figure 10:
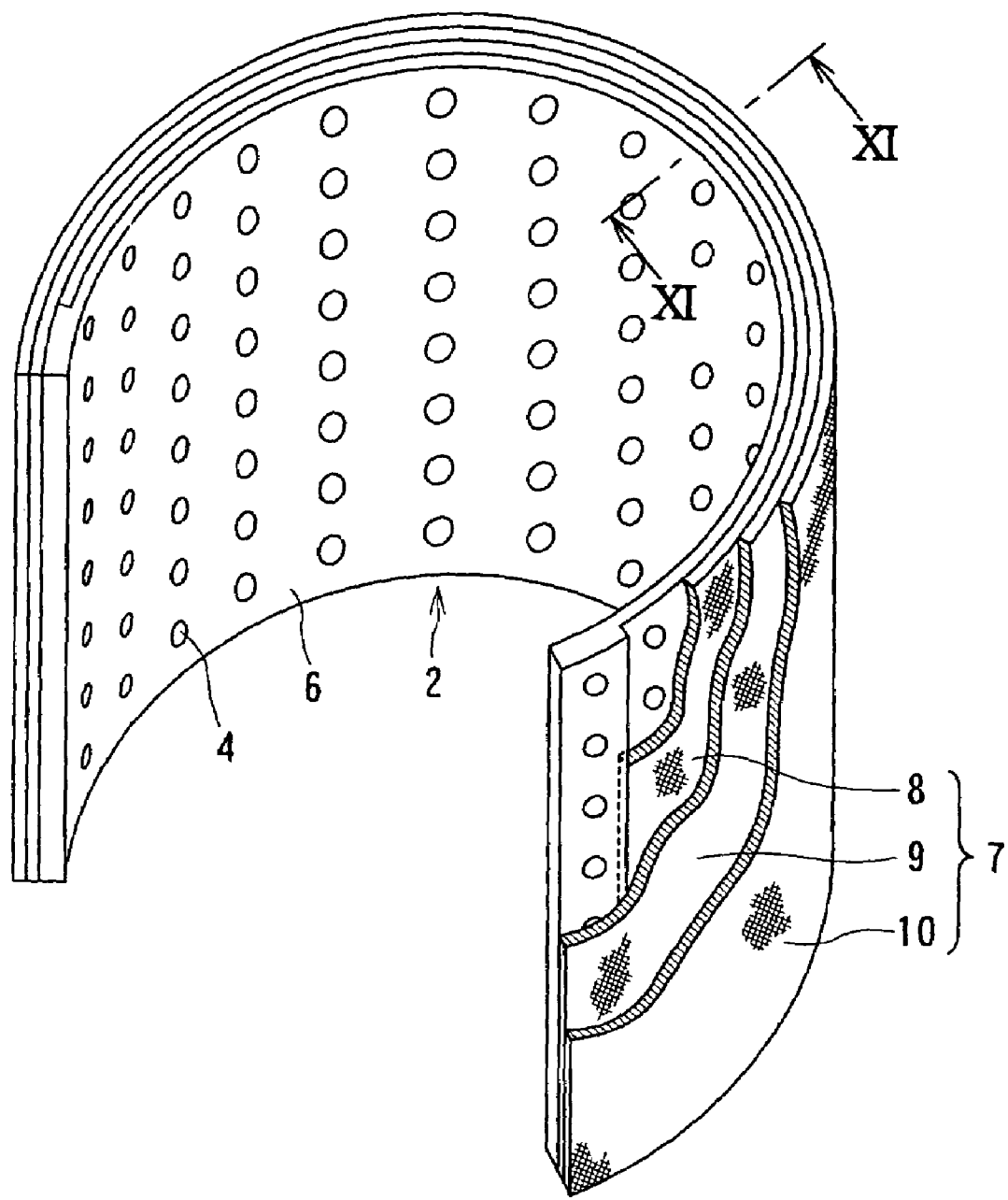
FIG. 10 is a perspective sectional view taken along the line X-X shown in FIG. 9.
Figure 11:
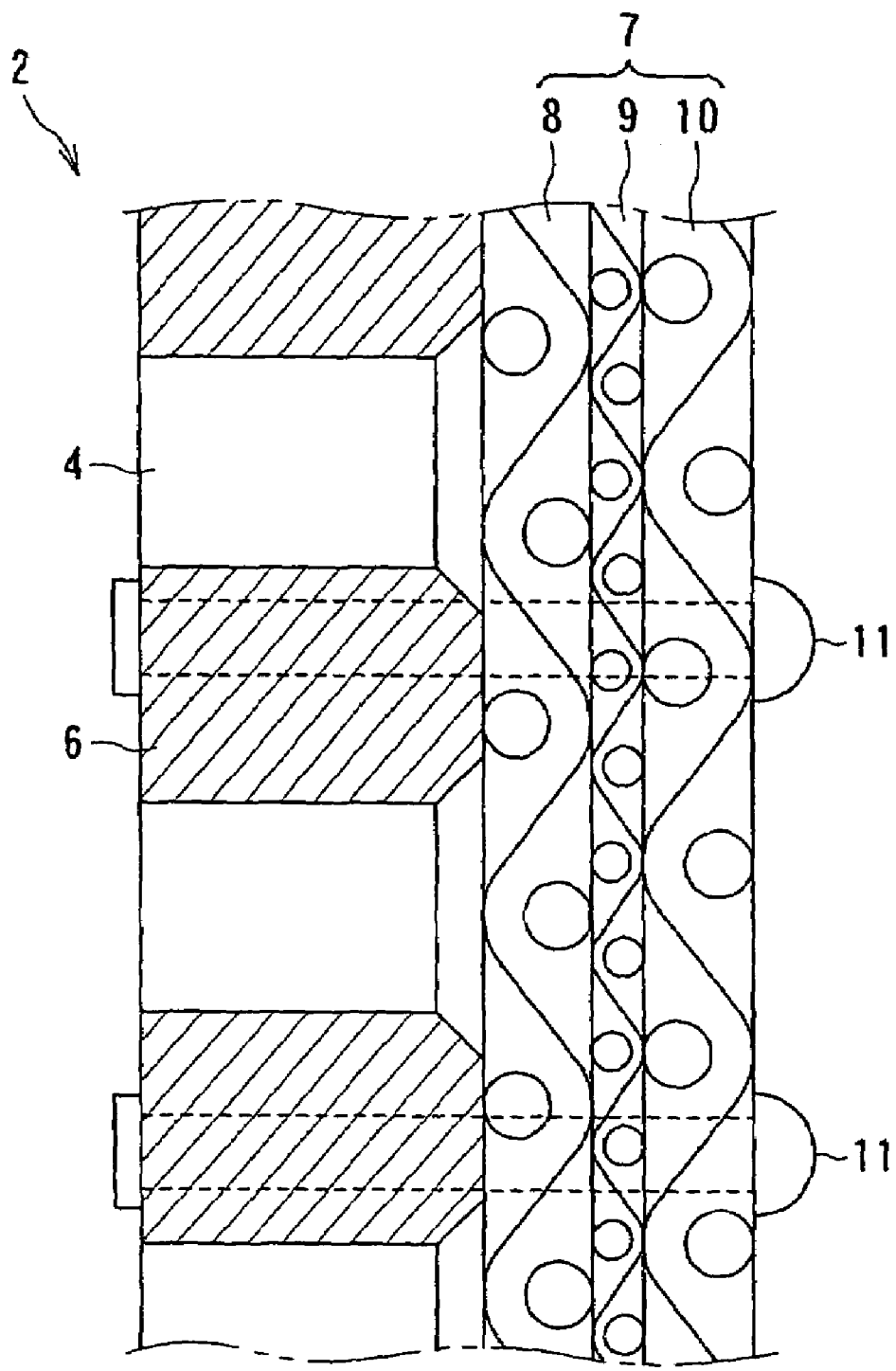
FIG. 11 is a sectional view taken along the line XI-XI shown in FIG. 10.

FIG. 8 is a sectional view of a steam valve according to a fourth embodiment of the present invention showing a state similar to FIG. 2.

In this embodiment, the permanent screen unit 37 and the temporary screen unit 38 have cylindrical structures or substantially cylindrical structures made of perforated plates formed with the perforations 39a and the perforations 39b, respectively, to maintain high strength. Accordingly, the body 33 of the strainer 22 is provided with no closed area 35 and the strainer body 33 has holes 34 formed along the entire periphery.

As a result, the permanent screen unit 37 and the temporary screen unit 38 of this embodiment can effectively handle or deal with shock caused by the main steam and with foreign objects contained in steam entering through the first main-steam inlet 19 in a trial run in terms of strength.

Furthermore, in the case where the permanent screen unit 37 and the temporary screen unit 38 has substantially-cylindrical structures made of plates, it may be possible to direct the jointed portion between the permanent screen unit 37 and the temporary screen unit 38 towards the first main-steam inlet 19 or locate at an optional angular position.

It is further to be noted that the term "cylindrical" used in the specification refers to the shape of a hollow cylindrical structure having a cross-section of a polygon or other shapes.

Furthermore, it is to be noted that the present invention is not limited to the described embodiment and many other changes and modifications may be made without departing from the scopes of the appended claims.

What is claimed is:

1. A steam valve comprising:

a steam inlet;

a valve body for regulating a flow of steam entering into the valve body through the steam inlet;

a valve casing accommodating the valve body and communicated with the steam inlet;

a strainer arranged between the valve body and the valve casing so as to surround the valve body, and adapted to remove a foreign object contained in the steam; and a screen assembly mounted to an outer peripheral portion of the strainer, said screen assembly including at least one screen unit formed from a perforated plate, wherein said strainer has a cylindrical structure and said perforated screen assembly is mounted on the outer peripheral portion of the cylindrical strainer; and said screen assembly is formed with a number of perforations, and when a side portion of the screen assembly mounted on the peripheral portion of the cylindrical strainer is developed, the perforations formed to the screen assembly have an arrangement in a fashion that centers of neighboring three perforations constitute vertexes of a regular triangle having one side of a length corresponding to a pitch "a" of adjacent two perforations, the pitch "a" being a sum of a diameter "d" of the perforations and a distance L between the adjacent two perforations, the diameter "d" and pitch "a" being set to optional values, respectively, in accordance with the arrangement of the screen assembly relative to the strainer.

* * * * *